US007984611B2

(12) United States Patent
Djurovic et al.

(10) Patent No.: US 7,984,611 B2
(45) Date of Patent: Jul. 26, 2011

(54) HYDRAULIC CONTROL SYSTEM

(75) Inventors: Milan Djurovic, Stuttgart (DE); Peter Stachnik, Markgroeningen (DE); Gerhard Keuper, Leonberg (DE); Heinrich Loedige, Valhingen (DE)

(73) Assignee: Robert Bosch GmbH, Stuttgart (DE)

( * ) Notice: Subject to any disclaimer, the term of this patent is extended or adjusted under 35 U.S.C. 154(b) by 550 days.

(21) Appl. No.: 12/192,375

(22) Filed: Aug. 15, 2008

(65) Prior Publication Data

US 2009/0044527 A1 Feb. 19, 2009

(30) Foreign Application Priority Data

Aug. 16, 2007 (DE) ......................... 10 2007 038 707
Aug. 22, 2007 (DE) ......................... 10 2007 039 770
Sep. 25, 2007 (DE) ......................... 10 2007 045 802

(51) Int. Cl.
*F16D 31/02* (2006.01)
(52) U.S. Cl. ............................................ 60/422; 60/469
(58) Field of Classification Search .................... 60/420, 60/422, 468, 469; 91/516
See application file for complete search history.

(56) References Cited

U.S. PATENT DOCUMENTS 5,069,111 A * 12/1991 Loffler et al. .................. 91/516
7,870,728 B2 * 1/2011 Keuper et al. .................. 60/422
2005/0284143 A1 * 12/2005 Mamei et al. .................. 60/422
2007/0169473 A1 * 7/2007 Esders ........................... 60/422
2009/0007556 A1 * 1/2009 Djurovic et al. ................ 60/420

FOREIGN PATENT DOCUMENTS

DE 10 2006 008 940 8/2007

* cited by examiner

*Primary Examiner* — Michael Leslie
(74) *Attorney, Agent, or Firm* — Michael J. Striker

(57) ABSTRACT

A hydraulic control system for controlling preferably at least two consumers, has a pump with an adjustable delivery quantity supplying pressure fluid, an adjustable metering orifice with which the consumers are each associatable, a power beyond connection to which at least one power beyond consumer is connectable, an inlet pressure governor unit situated downstream of the pump and acted on in a closing direction by a load pressure of the consumers or of the at least one power beyond consumer, the inlet pressure governor unit being provided in a pressure fluid flow path between the pump and at least one of the two consumers, while the power beyond connection branching off from a pressure fluid flow path between the pump and the inlet pressure governor unit, a tank, the inlet pressure governor unit in a spring-prestressed position closing a connection to the at least one of the two consumers and the tank, and in another position a pressure fluid connection to the tank is opened, the inlet pressure governor unit being movable into an additional position in which a throttled connection to the tank is opened.

13 Claims, 5 Drawing Sheets

HYDRAULIC CONTROL SYSTEM

CROSS-REFERENCE TO RELATED APPLICATIONS

The invention described and claimed hereinbelow is also described in German Patent Applications DE 10 2007 038 707.7 filed on Aug. 16, 2007, DE 10 2007 039 770.6 filed on Aug. 22, 2007 and DE 10 2007 045 802.0 filed on Sep. 25, 2007. This German Patent Application, whose subject matter is incorporated here by reference, provides the basis for a claim of priority of invention under 35 U.S.C. 119(a)-(d).

BACKGROUND OF THE INVENTION

The invention relates to a hydraulic control system for controlling a plurality of consumers.

Hydraulic control systems of this kind are used particularly in mobile machines such as wheel loaders or tractors in order to supply pressure fluid to their consumers, e.g. the working hydraulics, the steering, traveling mechanisms, and/or accessories. DE 10 2006 008 940.5 has disclosed a hydraulic control system that is embodied in the form of an LS system. In an LS system of this kind, the delivery quantity of the pump is regulated so that in the pump line, a pump pressure prevails that lies a certain pressure difference □p above the maximum load pressure of the consumers. In the known systems, each consumer is associated with an adjustable metering orifice and an individual pressure governor by means of which the volumetric flow of pressure fluid to the consumer can be controlled as a function of the opening cross-section of the metering orifice, independent of the load. In this LS system, downstream of the pump, an inlet pressure governor can be provided, which can open a connection to the tank. This inlet pressure governor is acted on in the closing direction by a spring and by a control pressure that corresponds to the maximum load pressure and is acted on in the opening direction by the pump pressure. Its position is a measure of the difference between the pump pressure and the maximum load pressure.

In order to connect attachments or accessories that do not have their own supply of pressure fluid, a so-called power beyond connection is provided, which has a pressure line, a return line, and an LS line. This power beyond connection permits the load-sensing system of the machine to also be used for the accessory. The power beyond connection for connecting a power beyond consumer branches off from the pressure fluid flow path between the pump and the inlet pressure governor. Then one of the load pressures of the working hydraulics consumers or of a power beyond consumer exerts pressure on the inlet pressure governor on the spring side. This hydraulic control system permits a prioritized supply to the power beyond consumers and a boosting of the regulating pressure difference between the pump pressure and the maximum load pressure when supplying power beyond consumers. In this embodiment, the slow reaction behavior of the inlet pressure governor when the power beyond consumer is switched on or off can be disadvantageous and can lead to pressure pulsations in the hydraulic control system.

SUMMARY OF THE INVENTION

In relation to this prior art, the object of the present intention is to produce a suitable hydraulic control system in which the hydraulic pulsations behavior is improved.

According to the invention, a hydraulic control system preferably controls at least two consumers, e.g. mobile machines, that can be supplied with pressure fluid by a pump with an adjustable delivery quantity and that are each associated with an adjustable metering orifice. The hydraulic control system also has a power beyond connection to which at least one power beyond consumer can be connected and one inlet pressure governor unit (IPGU) downstream of the pump, which is acted on in the closing direction by a load pressure of the consumers or of at least one power beyond consumer. The IPGU is provided in the pressure fluid flow path between the pump and at least one of the two consumers. The power beyond connection branches off from the pressure fluid flow path between the pump and the IPGU; in a spring-prestressed position, this IPGU closes the connection to the at least one of the two consumers and a tank and in another position, it opens a pressure fluid connection to a tank; the IPGU has an additional position in which a throttled connection to the tank is opened. This has the advantage that in a throttled position of the IPGU, some residual flow of pressure fluid continuously flows out into the tank; this residual flow of pressure fluid does in fact cause minimal pressure fluid losses, but leads to a significantly better system damping of the hydraulic control system.

In a preferred embodiment, The IPGU is a continuously adjustable 3/5-way directional control valve that has a pump connection, a working connection, and a tank connection and can be moved into a closed position, two working positions, and two transition positions; in the two working positions, a communication is opened between the pump connection, the working connection, and the tank connection and in the two transition positions, a communication is opened between the pump connection and the working connection. The single-valve embodiment of the IPGU makes it very compact and space-saving.

In another preferred embodiment, the IPGU has at least two continuously adjustable valves; one valve is a 3/3-way directional control valve equipped with a pump connection, a working connection, and a tank connection, and the other is a 2/3-way tank valve equipped with a pressure connection and a tank connection, whose pressure connection is connected to the working connection of the 3/3-way directional control valve. The 3/3-way directional control valve can be moved into a closed position and toward two working positions; in one working position, a communication is opened between the pump connection, the working connection, and the tank connection and in the other, a communication is opened between the pump connection and the working connection. The 2/3-way tank valve can be moved into a closed position and toward two working positions; in the one working position, a throttled connection is opened between the pressure connection and the tank connection and in the other position, this connection is closed. This dual-valve embodiment is very advantageous since the total length of the IPGU can be significantly reduced.

The IPGU preferably has a tank conduit that connects the tank connection of the 3/3-way directional control valve to a tank line.

In another advantageous embodiment of the IPGU, it has a continuously adjustable 2/3-way directional control valve, which is equipped with a pump connection and a working connection, and a continuously adjustable 2/3-way tank valve, which is equipped with a pressure connection and a tank connection and whose pressure connection is connected to the working connection. In this case, the one 2/3-way directional control valve can be moved into a closed position and toward two working positions; in the working positions, a communication is opened between the pump connection and the working connection. The 2/3-way tank valve can also be moved into a closed position and toward two working positions; in the one working position, a throttled connection is produced between the pressure connection and tank connection and in the other, an unthrottled connection is produced between the pressure connection and the tank connection. The low number of inlets and outlets to the valve permits a very simple and therefore very inexpensive embodiment of the valve.

Both of the 2/3-way directional control valves or the two other 2/3-way and 3/3-way directional control valves are preferably matched to one another hydromechanically so that they are controlled synchronously and are each situated in the same position. As a result, they can have the same functional properties as the 3/5-way directional control valve.

In a dual-valve embodiment, both valves of the IPGU are preferably acted on in the closing direction by the force of a spring and by the maximum load pressure and are each acted on in the other direction by the pressure at their respective pressure connection. In a one-valve embodiment of the IPGU, it is likewise preferably acted on in the spring-prestressed closing direction by the maximum load pressure and is acted on in the other direction by the pressure at its respective pressure connection.

The spring arrangement that acts on the IPGU in the closing direction preferably has two springs, the second of which comes into effective engagement only after a predetermined partial stroke of the control piston.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
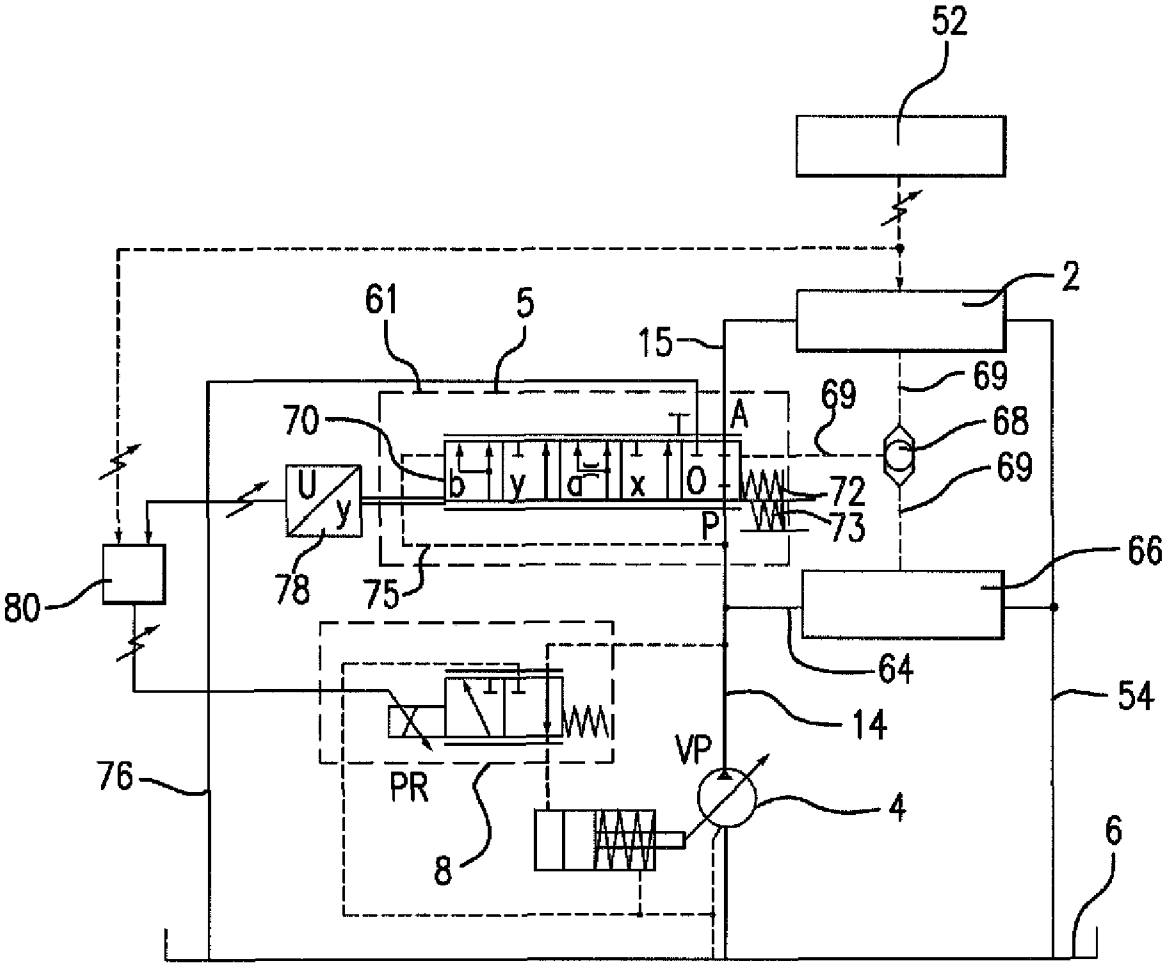
FIG. 1 shows a hydraulic control system corresponding to a first exemplary embodiment.

FIG. 1 shows a first exemplary embodiment of a hydraulic control system of a mobile machine, for example a farming tractor. This control system can, for example, be composed of a mobile control block that supplies a set of working hydraulics 2 with pressure fluid that a pump 4 delivers to consumers via an inlet pressure governor unit 5 (IPGU) and the working hydraulics 2 and that is returned from them to a tank 6. In exemplary embodiment shown, the pump 4 is embodied in the form of an electrically controllable variable delivery pump whose pivot angle can be adjusted by means of a pump regulator 8. In lieu of an electrically controllable variable delivery pump, it is also possible to use a speed-controlled fixed displacement pump or another pump that can be controlled by means of a pump regulator.

Figure 2:
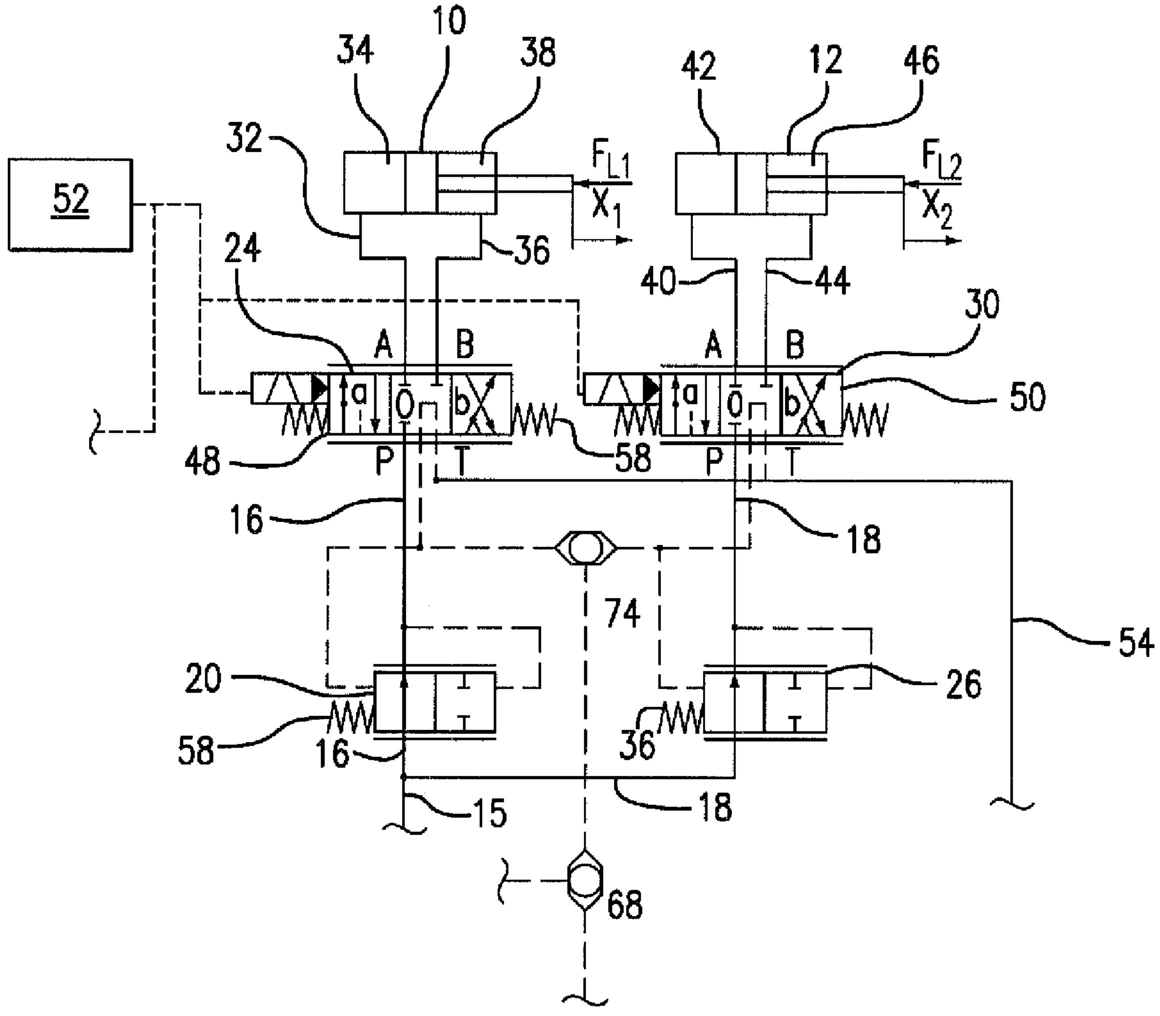
FIG. 2 shows a detail of the hydraulic control system according to the first exemplary embodiment.

FIG. 2 shows the layout of the set of working hydraulics 2 from FIG. 1, which in this case has two dual-acting cylinders 10, 12. The pressure fluid that the pump 4 draws from the tank 6 (see FIG. 1) is delivered via the IPGU 5 into a pump conduit 15 that branches into two inlet lines 16, 18; the inlet line 16 is associated with the cylinder 10 and the inlet line 18 is associated with the cylinder 12. In the inlet line 16 leading to a continuously adjustable directional control valve 24, an individual pressure governor 20 is provided, with the directional control valve 24 serving to adjust the pressure fluid flow direction to and from the consumer and to adjust the volumetric flow of pressure fluid. In the inlet line 18 leading to a continuously adjustable directional control valve 30, an individual pressure governor 26 is provided, with the directional control valve 30 serving to adjust the pressure fluid flow direction to and from the consumer and to adjust the volumetric flow of pressure fluid. The working connections A, B of the directional control valve 24 are connected to a supply line 32, which is connected to a bottom-end cylinder chamber 34 of the cylinder 10, and a return line 36, which is connected to an annular chamber 38 at the piston rod end of the cylinder 10. The working connections A, B of the directional control valve 30 are connected to a supply line 40, which is connected to a bottom-end cylinder chamber 42 of the cylinder 12, and a return line 44, which is connected to an annular chamber 46 at the piston rod end of the cylinder 12.

The control piston 48 of the directional control valve 24 and the control piston 50 of the directional control valve 30 are controlled by a preliminary control unit 52 or through manual actuation. By means of the manual actuation or actuation of the preliminary control unit 52, which adjusts the control pressure difference, the respective control piston 48, 50 is moved out of the closed position (0) shown in FIG. 2 toward the indicated positions (a) or (b) in which either the cylinder chamber 34, 42 or the annular chamber 38, 46 is supplied with pressure fluid, while the pressure fluid is displaced from the respective other pressure fluid chamber. In this case, an inlet control edge opens an inlet metering orifice into the directional control valves 24, 30 and the opening cross section of the respective metering orifice determines the volumetric flow of pressure fluid to the cylinder 10, 12. The pressure fluid flowing back from the cylinder 10, 12 is conveyed back to the tank 6 via a tank connection T at the respective directional control valve 24, 30 and a tank line 54 connected to it (see FIG. 1).

The individual pressure governors 20, 26 are each acted on in the opening direction by the force of a pressure governor spring 56, 58 and by the load pressure at the respective consumer 10, 12. The respective pressure governor slider of each of the individual pressure governors 20, 26 is acted on in the closing direction by the pressure in the respective inlet line 16, 18 between the outlet of the respective individual pressure governor 20, 26 and the pressure inlet P of the subsequent directional control valve 24, 30. The respective directional control valve 24, 30 and the associated metering orifice, which is embodied by the respective directional control valve 24, 30, constitute a current regulator. The pressure drop via its metering orifice is kept constant independent of the load so that the quantity of pressure fluid flowing through the metering orifice depends solely on the opening cross section of the metering orifice.

According to FIG. 1, the IPGU 5—which in this exemplary embodiment is embodied in the form of a continuously adjustable 3/5-way inlet pressure governor 61 (IPG) or a 3/5-way directional control valve and is depicted with a dashed line—is provided in the pressure fluid flow path between the pressure connection of the pump 4 and the branch point of the inlet lines 16, 18 (see FIG. 2).

A power beyond connection 64 branches off from a pump line 14 between the pressure connection of the pump 4 and the pressure inlet connection P of the IPG 61. This power beyond connection 64 makes it possible to connect one or more additional hydraulic power beyond consumers 66, e.g. a self loading forage box or a potato harvester, to the mobile machine.

The power beyond consumers 66 can also be connected to the tank 6 via the tank line 54. The maximum load pressure of the power beyond consumers 66 is determined by means of a shuttle valve cascade and supplied via a control line 69 to the shuttle valve 68 in a control line 69. The maximum load pressure of the consumers 10, 12 is tapped by the shuttle valve 74 (see FIG. 2) and likewise supplied to the shuttle valve 68.

The slider 70 of the IPG 61 is acted on in the closing direction by the force of a spring packet equipped with two springs 72, 73 and by the maximum load pressure of the two consumers 10, 12 (see FIG. 2) or of the power beyond consumer 66 from the control line 69.

The spring packet, see FIG. 1, has the two springs 72, 73; the first spring 72 is always active and exerts a force on the slider 70 of the IPG 61 in the closing direction, while the second spring 73 is active in the transition position (y) and likewise exerts a force on the slider 70 in the closing direction; an automatic increase of the regulating pressure difference at the IPG 61 occurs with the adjustment of the regulating position from the working position (a) to the working position (b). In this case, use is made of the fact that with the activation of a power beyond consumer 66, the regulating position of the IPG 61 is shifted toward the right with regard to FIG. 1, to the working position (b). Due to the action of the second spring, in order to reach this regulating position, a correspondingly higher pressure difference is required between the pressure in the control line 69 and the pressure in the control line 75.

The slider 70 of the IPG 61 is acted on in the opening direction by the pressure in a control line 75, which the pump line 14 taps upstream of the IPG 61, between the power beyond connection 64 and the IPG 61. The inlet connection P of the IPG 61 has a pressure fluid connection to the pump line 14, while the working connection A of the IPG 61 is connected to the inlet line 16, 18 (see FIG. 2). The tank connection T of the IPG 61 has a pressure fluid connection to the tank 6 via a tank line 76.

In the closed position (0) of the IPG 61 shown in FIG. 1, there is no pressure fluid connection between the pump (pressure) connection P, the working connection A, and the tank connection T. The spring 72 acts on the slider 70 of the IPG 61 in the direction of its closed position (0). In the working position (a), which is reached via a transition position (x), there is a pressure fluid connection between the pump connection P and the working connection A, while the tank connection T has a throttled pressure fluid connection to the pump connection P. In the working position (b), which is reached via the transition position (y) and in which the slider 70 is acted on by the force of the two springs 72, 73, the pump connection P and the tank connection T can likewise be connected to each other in a throttled fashion. In addition, the corresponding control edge serves as a safeguard against excess volumetric flow in the system, for which purpose in addition to the fine control range, there is also a large cross sectional range. In the transition position (x) and (y), there is a pressure fluid connection between the pump connection P and the working connection A, with the tank connection T being closed. The transition positions (x), (y) serve to close the tank connection T within an extremely short span of time and with a small travel distance of the slider 70, for example in the event of an undersupply of pressure fluid to the consumers.

The position of the slider 70 of the IPG 61 is detected by a travel sensor 78, whose output signal is transmitted to a control unit 80 that also controls the pump regulator 8.

The actuation of the pump regulator 8 by means of the control unit 80 will be described in greater detail with reference to FIG. 3, which depicts a control concept for the hydraulic control system. The control unit 80 is supplied with a target value $y_{IPGtarget1}$ or $y_{IPGtarget2}$. The target value $y_{IPGtarget1}$, which lies in the region of the position (a) of the slider 70, is used when the power beyond consumer 66 is not connected, whereas the target value $y_{IPGtarget2}$, which lies in the region of the position (b) of the slider 70, is used when the power beyond consumer 66 is connected (see FIG. 1). A power beyond control 82 switches from $y_{IPGtarget1}$ to $y_{IPGtarget2}$ as the target value if the power beyond consumer 66 is connected. It switches the target value from $y_{IPGtarget2}$ to $y_{IPGtarget1}$ when the power beyond consumer 66 is disconnected. The power beyond control 82 is either initialized automatically or by means of a signal $U_{PB}$ from a user.

The respective target value is compared to an output signal $y_{IPG}$ of the travel sensor 78 and supplied to a regulator 84 in the control unit 80. The target value $y_{IPGtarget1}$ is selected in such a way that when the power beyond consumer 66 is not connected or is not activated, a position in the region (a) of the slider 70 of the IPG 61 is considered to be the target value, whereas when the power beyond consumer 66 is connected and activated, the target value $y_{IPGtarget2}$ is used to select a position in the region (b) of the slider 70 of the IPG 61. The output signals of the preliminary control unit 52 can likewise be supplied to the regulator 84 and can impinge on the regulating algorithm.

When the power beyond consumer 66 is not connected, the IPG 61, see FIG. 1, is moved from the closed position (0) toward the working position (a) via the transition position (x) when the pressure in the control line 75 at the control piston exceeds the maximum load pressure of the consumers 10, 12 in the control line 69 by the amount of the spring pressure produced by the spring force of the spring 72. The working position (a) of the IPG 61 assures that the pressure fluid is supplied by the pump 4 via the inlet pressure governor 61 to the consumers 10, 12 (see FIG. 2). With a rapid change in the volumetric flow demand of the consumers 10, 12, they are additionally supplied up to a certain limit by the residual pressure fluid flow, which normally drains into the tank 6 via the IPG 61 in this position (a). This residual pressure fluid flow is available very rapidly as a pressure fluid reserve, making it possible to simply compensate for pressure fluctuations in the consumers 10, 12 and thus permitting a better system damping on the whole.

If upon activation of a power beyond consumer 66, the control unit 80 sets a pressure increase in the pump line 14, then the IPG 61 is moved further toward the working position (b) via the transition position (y), in which a residual volumetric flow likewise drains out via the tank connection T and the tank line 76. Even when the volumetric flow demand of the power beyond consumer 66 is high, both the consumers 10, 12 and the power beyond consumer 66 are supplied with a sufficient amount of pressure fluid, as long as the pump 6 is embodied in a corresponding fashion.

The hydraulic control system according to the first exemplary embodiment also assures that with an increasing load pressure of the power beyond consumer 66, this higher load pressure acts on the IPG 61 in the closing direction via the control line 69; the IPG 61 then reduces or adjusts the pressure fluid flow to the other consumers 10, 12, thus avoiding an undersupply of the power beyond consumer 66 and giving it priority.

Figure 4:
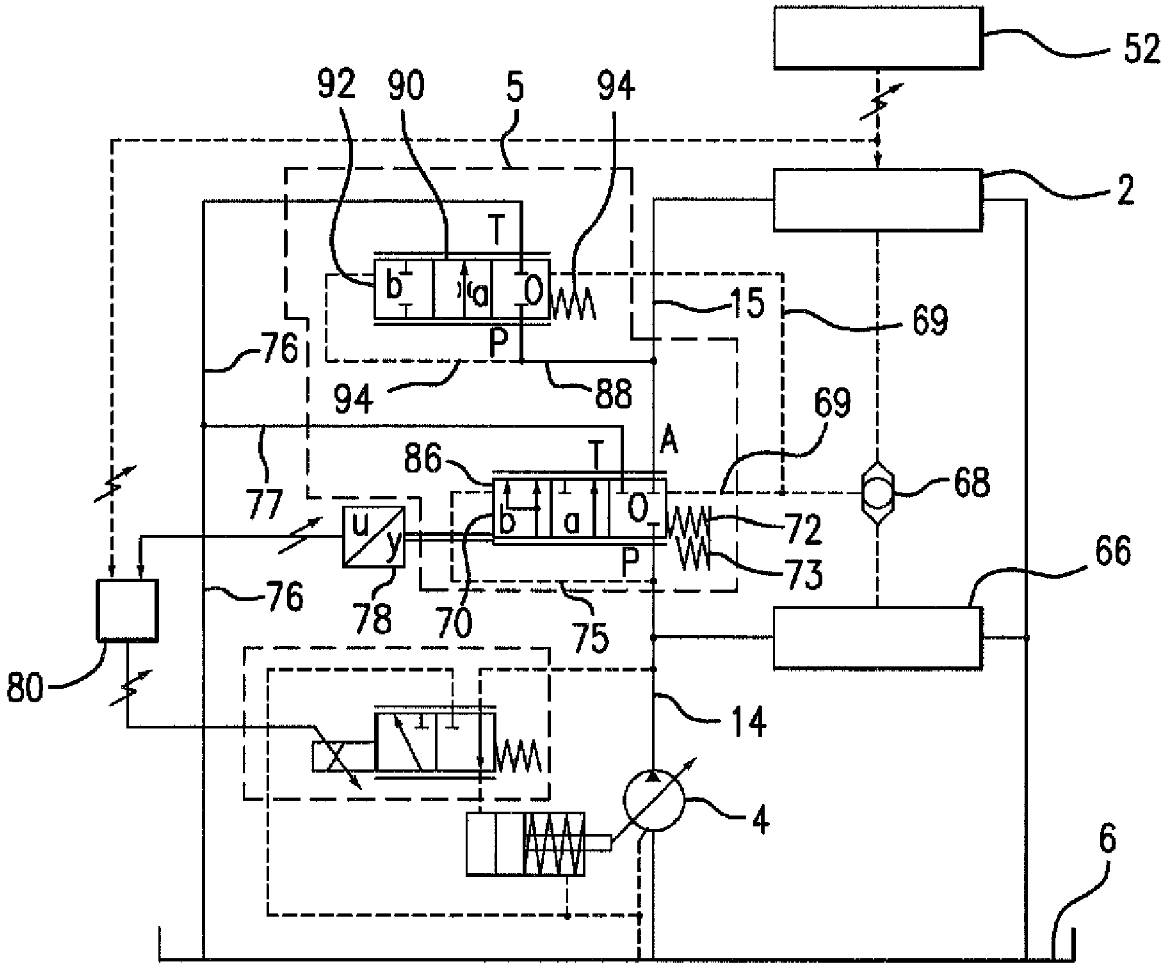
FIG. 4 shows a hydraulic control system corresponding to the second exemplary embodiment.

FIG. 4, which relates to a second exemplary embodiment of the invention, differs from the first exemplary embodiment in that the inlet pressure governor unit 5 (IPGU), which is depicted with a dashed line, is composed of two valves. One valve is embodied in the form of a continuously adjustable 3/3-way directional control valve 86, which has a pump connection P, a working connection A, and a tank connection T. The pump connection P is connected to the pump 4 via the pump line 14, the tank connection T is connected to the tank line 76 via a tank conduit 77, and the working connection A is connected to the working hydraulics 2 via the pump conduit 15. The section of the pump conduit 15 between the directional control valve 86 and the working hydraulics 2 has an inlet line 88 branching off from it, which is connected to a pressure connection P of a continuously adjustable 2/3-way tank valve 90 of the IPGU 5, whose tank connection T is pressure fluid connected to the tank 6 via the tank line 76.

As in the first exemplary embodiment, the slider 70 of the directional control valve 86 is acted on in the closing direction by the force of the spring packet equipped with the springs 72, 73 and by the maximum of the load pressures of the two consumers 10, 12 (see FIG. 2) or of the power beyond consumer 66 in the control line 69. The slider 70 of the directional control valve 86 is acted on in the opening direction by the pressure in the control line 75, which is tapped by the pump line 14 between the power beyond consumer 66 and the directional control valve 86.

The slider 92 of the tank valve 90 is prestressed in the closing direction by a spring 94 and by the maximum of the load pressures of the two consumers 10, 12 (see FIG. 2) or of the power beyond consumer 66 via a branching of the control line 69 between the shuttle valve 68 and the directional control valve 86. The slider 92 of the tank valve 90 is acted on in the other direction by the pressure in the pump conduit 15 downstream of the directional control valve 86, which is tapped by a control line 94.

In the closed position (0) of the directional control valve 86 shown in FIG. 4, there is no communication between the working connection A, the pump connection P, and the tank connection T. When the tank valve 90 is in the closed position (0), there is also no pressure fluid connection between the tank connection T and the pressure connection P. When the directional control valve 86 is in the working position (a), the working connection A is connected to the pump connection P and when the tank valve (90) is in the working position (a), a throttled pressure fluid connection is produced between the pressure connection P and the tank connection T. When the directional control valve 86 is in the working position (b), it connects the pump connection P to the tank 6 in a throttled or largely unthrottled fashion and when the tank valve 90 is in the working position (b), it closes the connection to the tank 6. The working position (b) of the directional control valve 86 corresponds to the working position (b) of the IPG 5 from FIG. 1.

Figure 3:
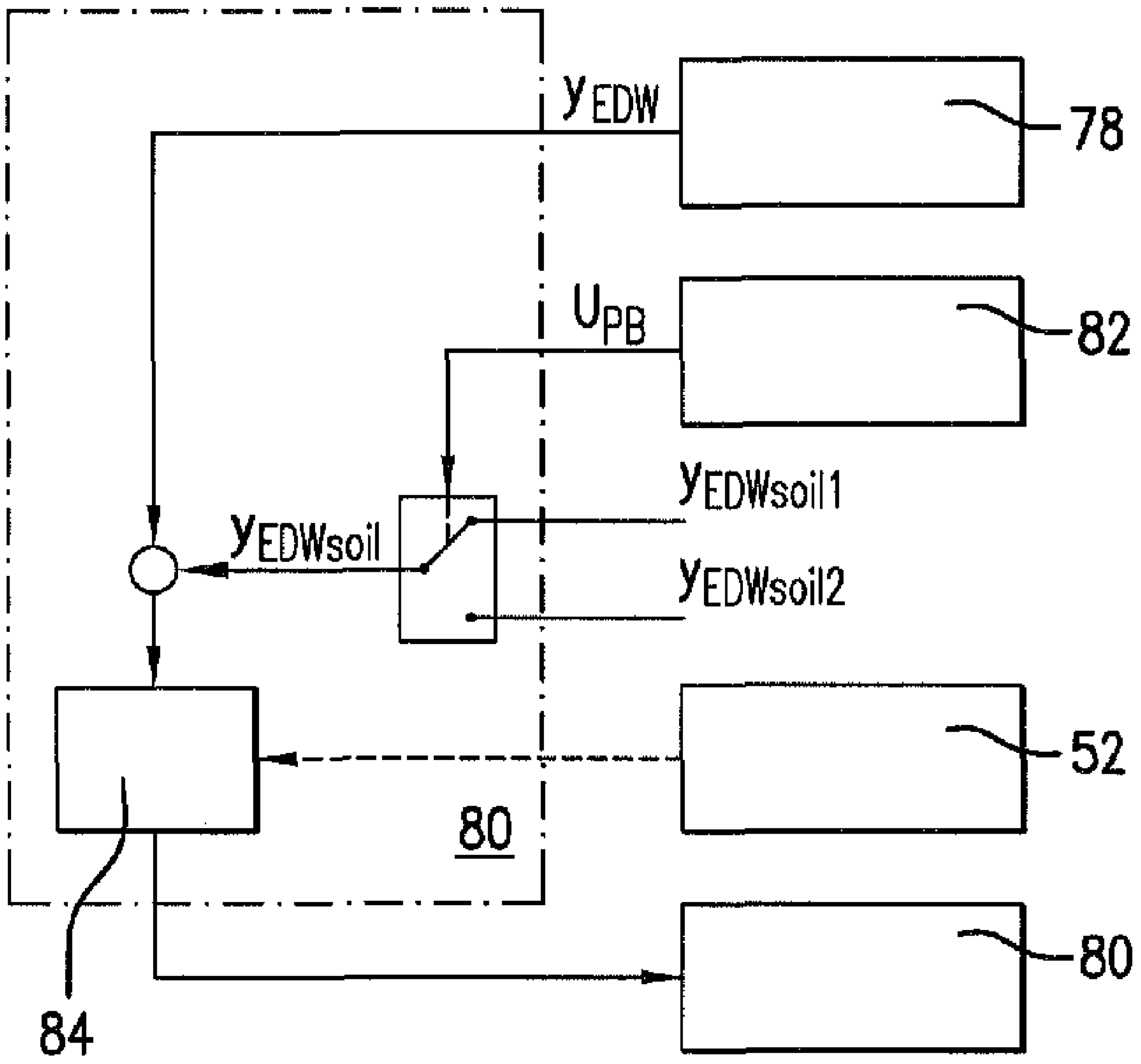
FIG. 3 shows a control concept corresponding to the first, a second, and a third exemplary embodiment.

The travel sensor 78 detects the position change of the directional control valve 86 and signals this to the control unit 80, which controls the pump 4 in accordance with the control concept from FIG. 3 and consequently in accordance with the first exemplary embodiment from FIG. 3. The IPGUs 5 from the first and second exemplary embodiments function in the same way.

The positions (a), (b), and (0) of the two valves 86, 90 are matched to one another hydromechanically. It is assumed initially that no power beyond consumer 66 is connected. The 3/3-way directional control valve 86 is moved from the closed position (0) toward the working position (a) when the pressure in the control line 75 acting on the slider 70 exceeds the maximum load pressure of the consumers 10, 12 in the control line 69 by the amount of the spring pressure produced by the spring force of the spring 72 (see FIG. 2). The working connection A and the pump connection P of the directional control valve 86 are then connected in the regulating position (a) that is established, as a result of which a pressure in the control line 94 of the tank valve 90 then comes into play, which is greater than the maximum load pressure of the consumers 10, 12 together with the spring pressure of the spring 94, causing the tank valve 90 to likewise be moved into the working positions (a). In these working positions (a) of the valves 86, 90, a residual pressure fluid flow travels to the tank, as in the first exemplary embodiment from FIG. 1.

Upon activation of a power beyond consumer, if the joystick is used to set a pressure increase in the pump line 14, then the 3/3-way directional control valve 86 is moved further toward the working position (b); in these positions, the connection is then opened to the tank conduit 77. The correspondingly increased pressure in the control line 90 likewise moves the 2/3-way tank valve 90 further toward the working position (b), closing the connection to the tank 6 via the tank valve 90. These working positions (b) of the two valves 86, 90 consequently have the same function as the working positions (b) of the first exemplary embodiment from FIG. 1.

This dual-valve embodiment of the IPGU 5 advantageously permits a short design.

Figure 5:
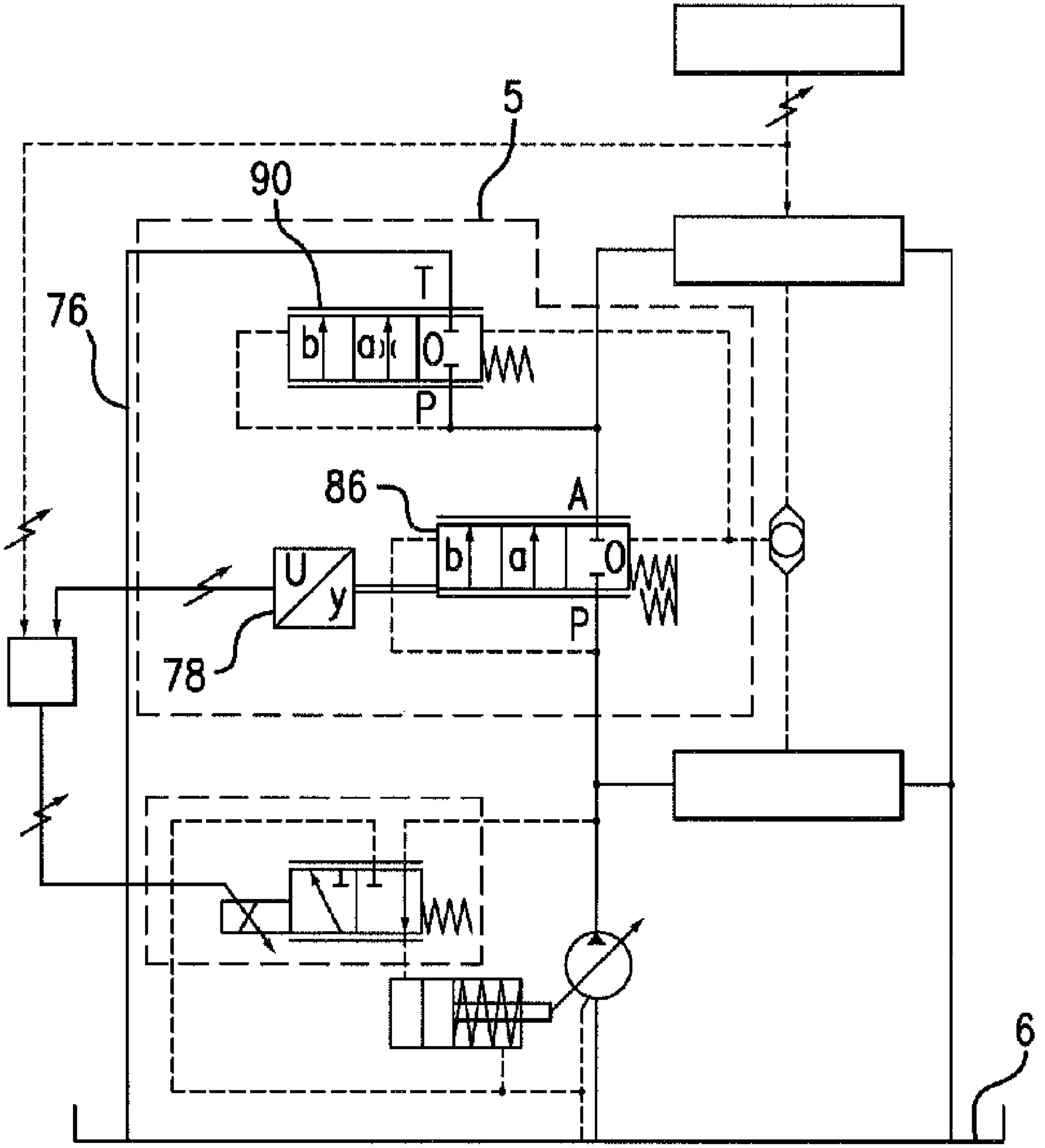
FIG. 5 shows a hydraulic control system corresponding to the third exemplary embodiment.

FIG. 5 shows a third exemplary embodiment of the inlet pressure governor unit 5, which, like the second embodiment (see FIG. 4), is composed of two valves 86, 90. The tank valve 90 differs from the second embodiment in that in the working positions (b), it opens an unthrottled pressure fluid connection to the tank 6 via the tank connection T and the tank line 76. In this embodiment, the directional control valve 86 is a continuously adjustable 2/3-way directional control valve; by contrast with the second embodiment from FIG. 4, there is no tank line 77, see FIG. 4, nor is there a tank connection any longer and consequently, in the working position (b), there is no pressure fluid connection to the tank 6. This pressure fluid connection is implemented by means of the working position (b) of the tank valve 90.

The positions (a), (b), and (0) of the valves 86, 90 are matched to one another hydromechanically as in the second embodiment, see FIG. 4. Their function is in the same as in the preceding exemplary embodiments and occurs in accordance with the control concept from FIG. 3.

The advantage of this third embodiment is the fact that the directional control valve 86 is very simply and inexpensively composed of a small number of connections.

In lieu of associating the travel sensor 78 with the directional control valve 86, it would also be conceivable to associate it with the tank valve 90, as a result of which the position control would take place by means of this latter valve.

The invention relates to a hydraulic control system for controlling at least one consumer that can be supplied with pressure fluid by means of a pump with an adjustable delivery quantity. In the pressure fluid flow path between the pump and at least one of the consumers, an inlet pressure governor unit is provided, which is able to open a connection to a tank. A power beyond connection for connecting the power beyond consumer branches off from a pressure fluid flow path between the pump and the inlet pressure governor unit. The inlet pressure governor unit is acted on in the closing direction by one of the load pressures of the consumers or of a power beyond consumer. In this inlet pressure governor unit, in a spring-prestressed position, the connection to the consumers is closed, while in another position, a connection to the tank is opened and in an additional position, a throttled connection to the tank is opened.

It will be understood that each of the elements described above, or two or more together, may also find a useful application in other types of constructions differing from the types described above.

While the invention has been illustrated and described as embodied in a hydraulic control system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic control system for controlling at least two consumers, comprising a pump with an adjustable delivery quantity and supplying pressure fluid; an adjustable metering orifice with which the consumers are each associatable; a power beyond connection to which at least one power beyond consumer is connectable; an inlet pressure governor unit situated downstream of said pump and acted on in a closing direction by a load pressure of the consumers or of the at least one power beyond consumer, said inlet pressure governor unit being provided in a pressure fluid flow path between said pump and at least one of the two consumers, while said power beyond connection branches off from a pressure fluid flow path between said pump and said inlet pressure governor unit; a tank, said inlet pressure governor unit in a spring-prestressed position closing a connection to the at least one of the two consumers and said tank, and in another position a pressure fluid connection to said tank is opened, said inlet pressure governor unit being movable into an additional position in which a throttled connection to said tank is opened.

2. The control system as defined in claim 1, wherein said inlet pressure governor unit is a continuously adjustable 3/5-way directional control valve equipped with a pump connection, a working connection, and a tank connection.

3. The control system as defined in claim 2, wherein said 3/5-way directional control valve is movable into a closed position, two working positions, and two transition positions, wherein in one of said working positions a communication is opened between said pump connection and said working connection and a throttled communication is opened to said tank connection, in another working position a communication is opened between said pump connection, said working connection, and said tank connection, and in said two transition positions a communication is opened between said pump connection and said working connection.

4. The control system as defined in claim 2, wherein said 3/5-way directional control valve is acted on in a closing direction by a force of a spring and by a maximum load pressure and is acted on in an opposite direction by a pressure at said pump connection.

5. The control system as defined in claim 1, wherein said inlet pressure governor unit has at least two continuously adjustable valves.

6. The control system as defined in claim 5, wherein one of said valves is a 3/3-way directional control valve equipped with a pump connection, a working connection, and a tank connection, and the other of said valves is a 2/3-way tank valve equipped with a pressure connection and a tank connection, whose pressure connection is connected to said working connection of said 3/3-way directional control valve.

7. The control system as defined in claim 6, further comprising a tank conduit that connects said tank connection of said 3/3-way directional control valve to a tank line.

8. The control system as defined in claim 6, wherein said 3/3-way directional control valve is movable into a closed position and toward two working positions, wherein in one of said working positions a communication is opened between said pump connection, said working connection, and said tank connection and in the other working position a communication is opened between said pump connection and said working connection, while said 2/3-way tank valve is movable into a closed position and toward two working positions, wherein in one of said working positions said throttled connection is opened between said pressure connection and said tank connection and when it is moved toward the two other positions said 2/3-way tank valve is closed.

9. The control system as defined in claim 5, wherein one of said valves is a 2/3-way directional control valve which is equipped with a pump connection and a working connection, and the other valve is a 2/3-way tank valve equipped with a pressure connection and a tank connection and whose pressure connection is connected to said working connection of said 2/3-way directional control valve.

10. The control system as defined in claim 9, wherein said one 2/3-way directional control valve is movable into a closed position and toward two working positions in which a communication is opened between said pump connection and said working connection, while the other of said 2/3-way tank valves is also movable into a closed position and toward two working positions, wherein in one of said working positions a communication is opened between a pressure connection and a tank connection and in the other of said working positions a throttled connection is opened between said pressure connection and said tank connection.

11. The control system as defined in claim 10, wherein said two valves are hydromechanically matched to each other so that they are controlled in synchronous fashion and are situated in the same position as each other.

12. The control system as defined claim 11, wherein said two valves are acted on in a closing direction by a spring arrangement and also by a maximum load pressure and are each acted on in an opposite direction by a pressure in their respective pressure connection or pump connection.

13. The control system as defined in claim 1, wherein said inlet pressure governor unit has a spring arrangement composed of two springs acting on it in a closing direction, a second of which comes into play only after a slider has executed a predetermined partial stroke.

* * * * *